United States Patent [19]

Chapin

[11] 3,924,603

[45] Dec. 9, 1975

[54] FLAMELESS HEAT SOURCE FOR USE THEREIN FOR SPLICING CABLES

[75] Inventor: Nancy L. Chapin, San Diego, Calif.

[73] Assignee: Kay Laboratories, Inc., San Diego, Calif.

[22] Filed: June 17, 1974

[21] Appl. No.: 480,022

[52] U.S. Cl....................... 126/263; 44/3 A; 44/3 C
[51] Int. Cl.² ............................................. F24J 1/04
[58] Field of Search ...... 126/204, 263, 400; 44/3 R, 44/3 A, 3 B, 3 C; 62/4, 530

[56] References Cited
UNITED STATES PATENTS

| | | | |
|---|---|---|---|
| 2,157,169 | 5/1939 | Foster................................ | 126/263 |
| 3,175,558 | 3/1965 | Caillouette et al. ............ | 126/263 X |
| 3,301,250 | 1/1967 | Glasser................................ | 44/3 R |

Primary Examiner—William F. O'Dea
Assistant Examiner—Ronald C. Capossela
Attorney, Agent, or Firm—Ellsworth R. Roston

[57] ABSTRACT

In a method for splicing cables, a first cable is connected to a second cable to form a junction and a heat shrinkable sleeve is positioned over the junction. A portable heat source having properties for developing a temperature in excess of 250° C is conformed around the sleeve to shrink the sleeve around the junction and thereby seal and insulate the junction. The heat source may include a metal salt which is mixed with a polyalcohol and an amine to produce heat. These chemicals react with each other in several types of reactions, each of which produces heat. Collectively, the reactions produce sufficient heat to maintain the temperature of the heat source at a magnitude such as 250° C for a period such as 20 minutes.

27 Claims, 18 Drawing Figures

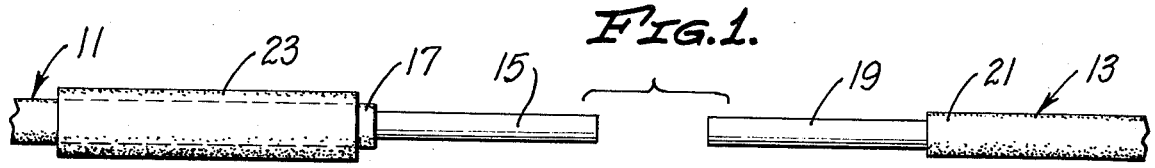
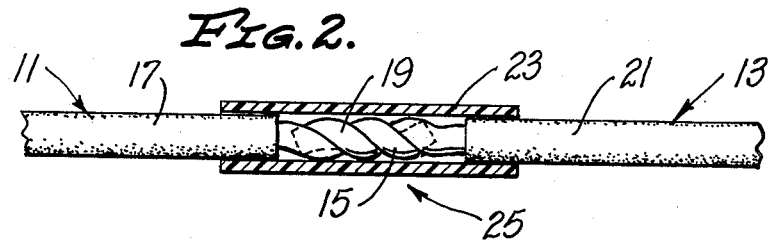
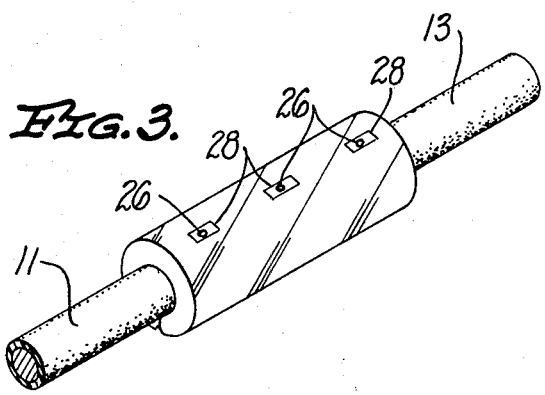
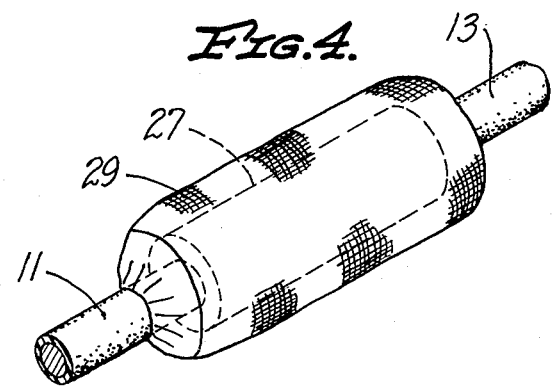
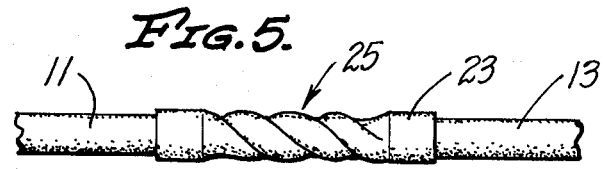
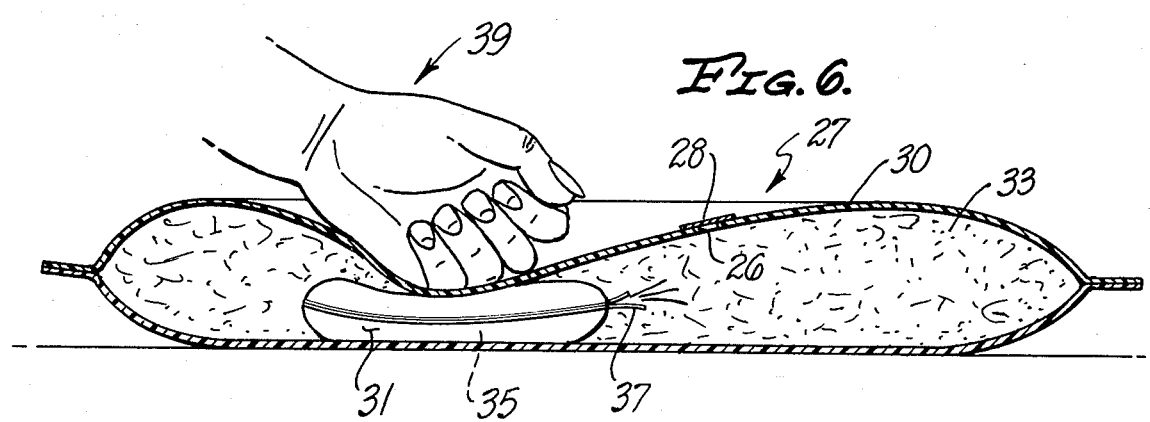

FIG. 7.
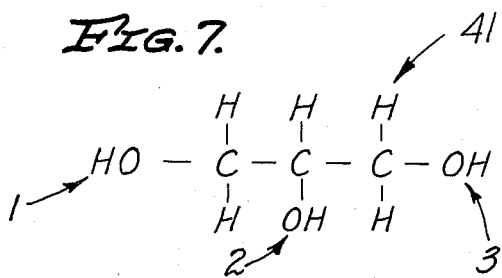
FIG. 8.
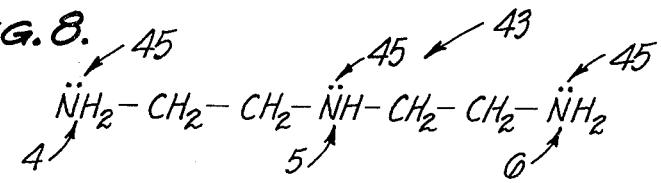
FIG. 9.
$\ddot{N}H_2 - CH_2 - CH_2 - \ddot{N}H_2$
FIG. 10.
$MgCl_2 + H_2O \longrightarrow MgCl_2 \cdot 6H_2O + heat$
FIG. 11.
FIG. 12.
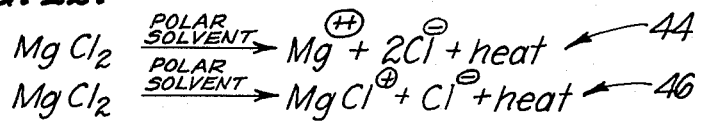
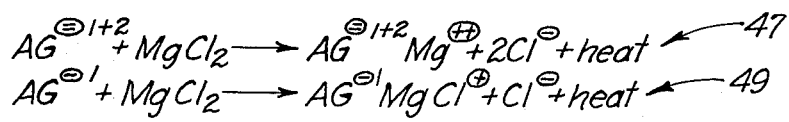
FIG. 13.
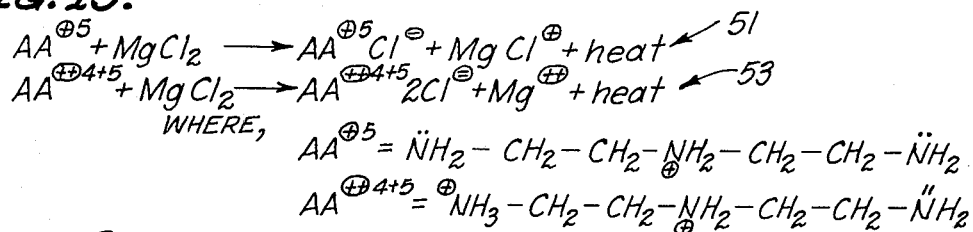
FIG. 14.
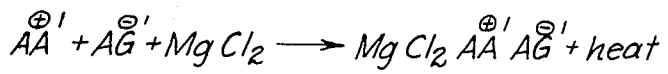

FIG. 15.
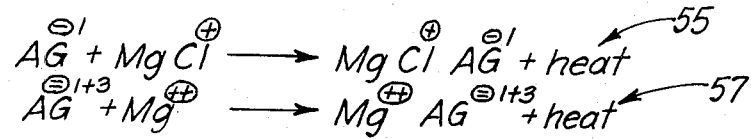
FIG. 16.
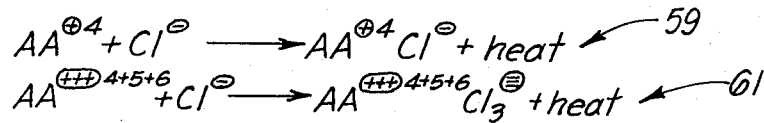
WHERE,
$AA^{\oplus 4} = {}^{\oplus}NH_3-CH_2-CH_2-\overset{..}{N}H-CH_2-CH_2-\overset{..}{N}H_2$
$AA^{\oplus\oplus\oplus\,4+5+6} = {}^{\oplus}NH_3-CH_2-CH_2-\overset{\oplus}{N}H_2-CH_2-CH_2-\overset{\oplus}{N}H_3$
FIG. 17.
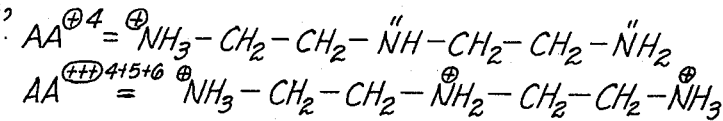
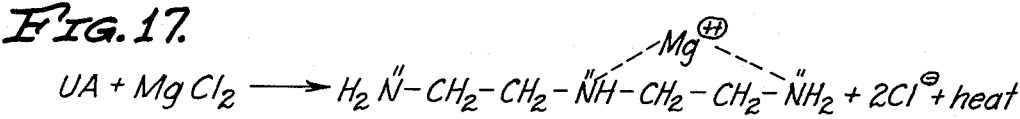
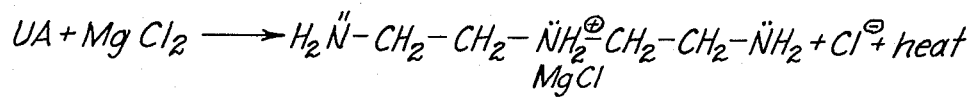
FIG. 18.
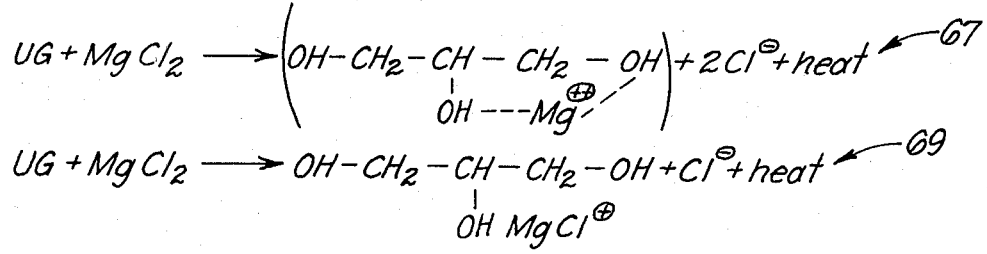

FLAMELESS HEAT SOURCE FOR USE THEREIN FOR SPLICING CABLES

BACKGROUND OF THE INVENTION

1. Field of the Invention

This invention relates generally to portable sources of heat and more specifically to sources of heat which are capable of producing temperatures in excess of 250° C.

2. Description of the Prior Art

It is often desirable to have a heat source which is capable of providing temperatures in excess of 250° C. Such devices can be used, for example, in an oven, a hot plate, or a space heater.

Such devices are also particularly advantageous for use with heat shrinkable tubing of the type commonly employed in splicing power and telephone cables. Thus, when two cables are spliced together to form a junction, a piece of heat shrinkable tubing can be placed over the junction and a high temperature heat source can be used to shrink the tubing and thereby seal the junction and form an insulation over the splice. It is particularly desirable that the heat from the heat source be applied evenly to the tubing so that it shrinks uniformly around the splice without burning the tubing. This method of cable splicing is often performed in remote locations and in dangerous environments such as mines and manholes wherein a highly combustible methane gas often collects.

There are many types of heat sources in the prior art but most of these sources can be grouped into three general classes: electrical heat sources, combustion heat sources, and chemical heat sources.

Electrical heat sources typically include a resistance element which provides heat in response to a flow of electrical current through the resistance element. The primary deficiency of these electrical devices is associated with their use of large quantities of electrical power. In order to make such heat sources somewhat portable, this power has typically been provided by electrical storage devices such as batteries. Such batteries have been relatively large and heavy. They typically include an acidic flux and tend to give off combustible gases which would increase the danger associated with an already explosive environment. The electrical heat sources provide for a relatively high temperature only in close proximity to the limited area of the resistance element. These devices do not provide a particularly uniform heat and therefore would have limited value for use with heat shrinkable tubing.

The combustion heat sources rely upon the ignition of a combustible fluid, such as gasoline, or a gas such as propane. An example of this type device is a propane blow torch which is sometimes used as the heat source in power and telephone cable splicing. A propane blow torch relies upon the burning of the propane gas to produce a flame having a high temperature. For use in cable splicing, this type of heat source has the same deficiency as the electrical heat sources—the heat is very localized in proximity to the flame. When used with heat shrinkable tubing, the tubing tends to shrink nonuniformly over its area. Some operators have developed a high degree of skill in moving the propane flame over the surface of the heat shrinkable tubing to provide for more uniform heat distribution. With such a high, localized temperature, the tubing is easily burned; this limits the effectiveness of the sealing and insulation characteristics of the tubing.

As exemplified by the propane blow torch, the combustion heat sources typically produce a flame. Such a heat source would be highly undesirable for use in dangerous environments such as mines and manholes wherein highly combustible gases often collect. In such an environment, any heat source producing a flame could cause a severe explosion.

Chemical heat sources are often desirable in a particular environment since they do not produce a flame. Typical of such heat sources is the flameless cooking apparatus disclosed in U.S. Pat. No. 3,314,413. This patent suggests the combination of aluminum powder, sodium hydroxide flakes, copper sulfate, and sodium chloride to which water can be added to produce an exothermic reaction. Although this flameless source of heat can be relatively portable, it suffers from many deficiencies of its own. For example, when the aluminum powder in the mixture is being consumed by the reaction, free hydrogen is given off. This gas is well known to be extremely combustible. Thus the use of such a device in a mine or manhole would only increase the combustible nature of the environment. Another by-product of this exothermic reaction is hydrochloric gas which is well known to be extremely toxic and particularly corrosive of metals.

The flameless cooking apparatus will provide a temperature of only approximately 150° C. This makes it useful for boiling water but of less advantage for shrinking tubing. Furthermore, the chemicals forming the flameless cooking device have a solid, block configuration that is not conformable to an irregular surface such as the surface of a piece of tubing.

A further deficiency of the flameless cooking apparatus is that it is not self-contained. In order to fire the apparatus, water must be added to the chemical package. Thus the package must be provided with means for opening the package for insertion of the water. Since a portion of the water will tend to boil from the package, means must also be provided to permit the escape of steam. The powdered aluminum is highly reactive and almost explosive in steam. Thus the flameless cooking apparatus is relatively unsafe and its temperature range is somewhat limited for use in cable splicing.

SUMMARY OF THE INVENTION

The heat source of the present invention provides a flameless heat which can be sustained at high temperatures, such as 250° C, for an extended period of time, such as 20 minutes. The heat source is self-contained and portable. It includes chemicals which are combined to react in a plurality of exothermic reactions; however, as opposed to the devices of the prior art, no toxic or caustic chemicals are given off by the reactions. The chemicals are initially relatively fluid so that the hot pack can be conformed to substantially any shape such as tubular shape. This fluid characteristic also enhances the initial mixing of the chemicals and provides for the uniform application of heat over an area of contact.

In a particular embodiment of the heat source, a first container encloses a second rupturable container. A metal shaft, such as magnesium chloride, is disposed in the first container, and a polyalcohol, such as glycerol, together with an amine, such as diethylenetriamine, are disposed in the second container. In the second container the polyalcohol has a plurality of hydrogen bonding sites that can react with the amine. In this reaction, the strong basic characteristics of the amine break the hydrogen bonds of the polyalcohol to produce an activated polyalcohol and an activated amine. The amine also reduces the viscosity of the polyalcohol.

When the second container is ruptured to activate the heat source, an impurity, such as water, in the polyalcohol initially reacts with the metal salt in the first container to produce a first quantity of heat. This first quantity of heat further reduces the viscosity of the polyalcohol to facilitate the reaction of the activated polyalcohol and the metal salt in a second plurality of reaction which produces a second quantity of heat. The activated amine and metal salt react in a third plurality of reactions to produce a third quantity of heat. Similarly, the unactivated polyalcohol and unactivated amine react with the metal salt in a fourth plurality of reactions and a fifth plurality of reactions which produce fourth and fifth quantities of heat, respectively. Even further heat producing reactions result from the combination of the metal salt, the activated polyalcohol, and the activated amine.

The significant number of heat producing reactions which occur substantially simultaneously produce sufficient heat to sustain the temperature of the hot pack at a magnitude such as 250° C for an extended period of time, such as 20 minutes. No caustic or toxic products of reaction are given off by any of the reactions.

Such a heat source is particularly desirable for use in a preferred method for splicing cables, such as power transmission cables and telephone cables. A piece of heat shrinkable tubing can be slid over one of a pair of conductor ends prior to the formation of the splice. After the conductor ends are joined, the tubing can then be positioned over the junction. At this point the flameless hot pack can be activated by rupturing the second container to release the polyalcohol and amine into the magnesium chloride. After these chemicals are mixed, the flexible hot packs can be wrapped around the heat shrinkable tubing and held in place by an insulation blanket. As the temperature of the pack rises, heat will be uniformly applied to the tubing to shrink its circumferential dimension. Thus the tubing can be shrunk to conform to the shape of the splice and thereby seal, insulate and protect the junction. After this is accomplished, the insulation blanket and heat source can be removed.

These and other features and advantages of the present invention will become more apparent with a description of the preferred embodiments with reference to the associated drawings.

DESCRIPTION OF THE DRAWINGS

FIG. 1 is a side elevational view of a pair of cables each having insulation stripped from the ends thereof to bare an associated conductor, and a heat shrinkable sleeve disposed over one of the cable ends;

FIG. 2 is a side elevational view of the cables with the conductors twisted together to form a junction and with the sleeve shown in cross section and positioned over the junction;

FIG. 3 is a perspective view of the cables with a hot pack disposed around the sleeve;

FIG. 4 is a perspective view of the cables with an insulation blanket disposed around the hot pack;

FIG. 5 is a perspective view of the cables with the insulation blanket and the hot pack removed to expose the sleeve shrunk around the junction to hermetically seal and insulate the conductors;

FIG. 6 is a cross-sectional view of a preferred embodiment of the hot pack having a first container enclosing a first chemical and a second rupturable container enclosing a second chemical within the first container, the second container being struck to activate the hot pack;

FIG. 7 illustrates the molecular structure of a glycerol molecule;

FIG. 8 illustrates the molecular structure of a diethylenetriamine molecule;

FIG. 9 illustrates the molecular structure of an ethylenediamine molecule;

FIG. 10 illustrates a chemical reaction which occurs in a hot pack including magnesium chloride and glycerol having an impurity of water;

FIG. 11 illustrates a chemical equation showing the decomposition of magnesium chloride in the presence of a polar solvent;

FIG. 12 illustrates a pair of chemical equations which are representative of a type of reaction which occurs between activated glycerol molecules and magnesium chloride to produce heat;

FIG. 13 illustrates a pair of chemical equations which are representative of a type of reaction which occurs between activated amine molecules and magnesium chloride to produce heat;

FIG. 14 illustrates a chemical equation which is representative of a type of reaction which occurs between activated amine molecules, activated glycerol molecules and magnesium chloride to form a combination salt and to produce heat;

FIG. 15 illustrates a pair of chemical equations which are representative of a type of reaction which occurs between activated glycerol molecules and magnesium chloride ions to produce heat;

FIG. 16 illustrates a pair of chemical equations which are representative of a type of reaction which occurs between activated amine molecules and chlorine ions to produce heat;

FIG. 17 illustrates a pair of chemical equations which are representative of a type of reaction which occurs between unactivated amine molecules and magnesium chloride to produce heat; and FIG. 18 illustrates a pair of chemical equations which are representative of a type of reaction which occurs between unactivated glycerol and magnesium chloride.

DESCRIPTION OF THE PREFERRED EMBODIMENTS

The present invention concerns a portable heat source which is capable of producing temperatures in excess of 250° C and a preferred method for splicing cables using the heat source. Some of the steps in this preferred method for cable splicing are shown in FIGS. 1 through 5.

Illustrated in FIG. 1 are a pair of cables designated generally by the reference numerals 11 and 13. The cable 11 includes a conductor 15 which is surrounded by insulation 17 along substantially its entire length. Similarly, the cable 13 includes a conductor 19 surrounded by insulation 21 along substantially its entire length. The insulation 17 and 21 on the cables 11 and 13 serves at least two purposes. First, it hermetically seals the associated conductors 15 and 19 to inhibit corrosion. Second, it isolates the conductors 15 and 19 so that electric current flowing therethrough is not short circuited through apparatus or personnel which might come in contact with the cables 11 and 13.

It should be understood that the cables 11 and 13 are merely representative of many types of cables which can be spliced. For example, the cables 11 and 13 may be power cables wherein the conductors 15 and 19 may have diameters of several inches. The cables 11 and 13 may also be one of several cables in a multiple conductor cable. The multiple conductor cables may be power cables including, for example, three power cables such as the cables 11 and 13. The multiple conductor cables may also be telephone cables including many conductor pairs in which case the cables 11 and 13 may represent, for example, only one of 500 wires in the multiple conductor cable.

The splicing of the cables 11 and 13 is desirable so that current flowing in the conductor 15 can be transferred to the conductor 19 for distribution to a distant location. One of the first steps in the splicing process is to strip the insulation 17 and 21 from the ends of the cables 11 and 13 respectively to bare the conductors 15 and 19. It is these conductors 15 and 19 which are joined to provide electrical continuity between the cables 11 and 13. Once the conductors 15 and 19 have been joined, there will be no insulation, such as the insulation 17 and 21, around the junction. Therefore in the preferred method herein disclosed, an insulating type material is provided around the conductors after they are joined to hermetically seal the junction and to insulate the conductors 15 and 19 at the junction.

This insulation type material can initially be in the form of a piece of tubing such as the sleeve designated generally by the numeral 23. This sleeve 23 can be in the form of a cylinder initially having a diameter greater than the diameter of the cables 11 and 13. The sleeve 23 is formed from a heat shrinkable material so that in response to an elevated temperature, the sleeve 23 will shrink to a diameter less than the diameter of the conductors 15 and 19. Sleeves of this type can be made from a polymer material which tends to shrink, for example, at a temperature such as 135° C which is maintained for a period such as ten minutes. Such sleeves can be purchased in various sizes and shapes from the Roychem Corporation of Menlo Park, California.

Prior to the joining of the conductors 15 and 19, the sleeve 23 is positioned over one of the cable ends such as the end of the cable 11 as illustrated in FIG. 1. Then the conductors 15 and 19 can be joined as shown in FIG. 2 to form a conductor junction designated generally by the reference numeral 25. The conductors 15 and 19 may be twisted at the junction 25 to increase the electrical continuity between the cables 11 and 13 and also to enhance the mechanical strength of the junction 25 although this step is typically omitted.

Once the conductors 15 and 19 have been joined the sleeve 23 can be moved along the cable 11 until it is positioned over the junction 25 with its ends preferably extending over the insulation 17 and the insulation 21 of the cables 11 and 13 respectively. In FIG. 2 the sleeve 23 is shown in axial cross section to more clearly illustrate the conductors 15 and 19 at the junction 25.

Once the conductors 15 and 19 have been joined, and the sleeve 23 has been positioned over the junction 25, it is desirable to heat the sleeve 23 so that it shrinks to hermetically seal the conductors 15 and 19 at the junction 25. It is of particular advantage that the shrinking of the sleeve 23 can be accomplished using a portable heat source which is capable of developing temperature in excess of 250° C. Structural features of a heat source particularly described for use in the present method will be described in greater detail below. However, it is readily apparent during this discussion of a preferred cable splicing method that it is highly desirable to have a heat source which not only provides the high temperatures needed but also provides portability and flexibility. The latter characteristic is desirable so that the heat source can be wrapped around an irregular surface such as that provided by the sleeve 23.

As noted, this type of splicing is often done in dangerous environments such as mines and manholes where methane gas collects. Therefore it is desirable that the heat source be flameless and that it give off no combustible, caustic, or toxic gases. In accordance with the present invention, a heat source in the form of a portable hot pack 27, is provided which has these highly desirable characteristics. The hot pack 27 is capable of generating temperatures in excess of 250° C and has flexible, generally fluid characteristics immediately after activation which permit it to be formed around the sleeve 23. These fluid characteristics also enhance the even distribution of the heat along the surface of the sleeve 23.

In this preferred method for cable splicing the hot pack 27 is activated and wrapped around the sleeve 23, as shown in FIG. 3, so that its high temperature heat shrinks the sleeve 23 into close proximity with the conductors 15 and 19. The hot pack 27 may be wrapped in blanket 29 as shown in FIG. 4 to maintain the pack 27 in contact with the sleeve 23. The blanket 29 preferably has insulation characteristics which inhibit the loss of heat from the pack 27 to the atmosphere. After a suitable length of time, such as 20 minutes, the blanket 29 and the hot pack 27 can be removed to expose the sleeve 23 which will have shrunk, as shown in FIG. 5, to hermetically seal and insulate the conductors 15 and 19 at the junction 25. It will be apparent to those skilled in the art that several of the hot packs 27 may be used simultaneously to heat an extended length of the sleeve 23.

The hot pack 27 of the present invention is illustrated in greater detail in FIG. 6. The pack 27 includes a first container 30 and a second container 31 disposed interiorly of the first container 30. A first chemical 33, which may have a particulate configuration, is preferably disposed exteriorly of the second container 31 but interiorly of the first container 30. A second chemical 35, preferably having a fluid state, is disposed interiorly of the second container 31. A plurality of vents 26 can be provided in the walls of the first container 30 to relieve any pressure which might build up within the container 30 as the temperature of the hot pack 27 rises. Pieces of tape 28, initially disposed over the vents 26 are responsive to the heat of the pack 27 to shrink and thereby expose the vents 26.

In this particular embodiment, the second container 31 is provided with a seal 37 which can be broken to rupture the container 31 and thereby release the second chemical 35 into contact with the first chemical 33. The breaking of the seal 37 to provide for the mixing of the chemicals 33 and 35 can be accomplished by striking the container 31 within the container 30 for example with a fist 39. The structural features of the containers 30 and 31 are described in greater detail and claimed in a patent application for a HOT OR COLD PACK AND APPARATUS FOR MAKING SAME, Ser. No. 290,003, filed on Sept. 18, 1972, and assigned of record to the assignee of record of the present application. It will be apparent that means other than the rupturable seal 37 for initially isolating the chemicals 33, 35 and subsequently rupturing the container 31 can be employed within the scope of the present invention.

When the seal 37 is broken, the first and second chemicals 33 and 35 respecively, mix and react to give off heat. The exothermic reaction and reactions which result therefrom provide the pack 27 with its highly desirable elevated temperature. It will be understood that these chemical reactions provide a particular quantity of heat and the actual temperature of the pack 27 will vary with the rate at which this heat is dissipated to the environment.

It is desirable that the material from which the container 29 is formed have characteristics including a melting point greater than the temperature of reaction. With this characteristic, the container 29 will be capable of enclosing the chemicals 33 and 35 throughout the exothermic reaction. It is also desirable that the containers 30 and 31 be formed from flexible materials to facilitate the rupture of the container 31 and also to permit the pack 27 to be conformed to a particular surface configuration. This will facilitate the even distribution of heat between the pack 27 and the object to be heated. A particular flexible material having characteristics for withstanding temperatures in excess of 250° C is the polyester material which is commonly used in cooking bags.

In preferred embodiments of the invention, the first chemical 33 includes a metal salt, such as magnesium chloride, calcium chloride or calcium oxide, and the second chemical 35 includes a polyalcohol such as glycerol, and an amine, such as diethylenetriamine or ethylenediamine. In these preferred embodiments, both the glycerol and the amine combine with the metal salt in a plurality of exothermic reactions described in greater detail below. More importantly, the glycerol and the amine react with each other to form activated glycerol and activated amine which also react with the metal salt in a plurality of exothermic reactions. The glycerol has hydrogen bonding sites that are activated by the strong basic characteristics of the amine. With some of its hydrogen bond sites activated, the glycerol is considerably more reactive with the metal salt. In addition to activating the glycerol, the amine also lowers the viscosity of the glycerol so that it is more free to mix and react with the metal salt.

The activated glycerol and activated amine occur in many forms each of which is reactive with the metal salt to produce heat. With the many possibilities for reactions, a particular molecule can easily find another molecule with which it can react. Thus the exothermic reactions occur at a rapid rate to support an elevated temperature such as 250° C for an extended period of time.

In a particular embodiment of the invention, the first chemical 33 includes magnesium chloride and the second chemical 35 includes glycerol and diethylenetriamine. These chemicals can occur in relative percentages by weight in the following ranges:

|  | magnesium chloride | 45% to 60% |
|---|---|---|
|  | glycerol | 30% to 40% |
| and | amine | 8% to 12% |

In a very specific example, it has been found that the pack 27 including by weight 53.6 percent of magnesium chloride, 35.7 percent of glycerol and 10.7 percent of amine is capable of maintaining a temperature of 250° C for as long as 20 minutes.

As noted, when the hot pack 27 is initially manufactured, the polyalcohol, such as glycerol, and the amine, such as diethylenetriamine, are combined in the container 31. Thus the reactions between the polyalcohol and the amine occur prior to the activation of the hot pack 27.

These reactions can be more easily understood with reference to FIG. 7 which illustrates a glycerol molecule 41. It can be seen that the molecule 41 includes three carbon atoms, five hydrogen atoms, and three hydroxyl groups which are shown generally at the sites designated by the reference numerals 1, 2 and 3. It is the purpose of the amine in the second chemical 35 to break up the hydrogen/oxygen bond in at least one of the hydroxyl groups located at the sites 1, 2 and 3. Actually, any chemical having strong basic properties, such as sodium hydroxide, can perform this function since it will have a stronger attraction for the hydrogen atom in the hydroxyl group than does the oxygen atom in the hydroxyl group. When the hydrogen atom is removed it acquires a positive charge and is then referred to as a hydrogen ion.

With the hydrogen atom removed from at least one of the sites 1, 2 and 3, the activated glycerol molecule hereinafter abbreviated "AG," will have at least one negative charge. Since this negative charge may occur at one or more of the sites 1, 2 and 3, there will be seven different types of AG molecules in the second chemical 35. These molecules can be illustrated with a notation including an encircled charge and a corresponding number indicating the particular site 1, 2 or 3 from which the hydrogen atom is removed. For example, molecules expressed as $$AG^{\ominus 1}, AG^{\ominus 2} \text{ and } AG^{\ominus 3},$$

would designate activated glycerol molecules having a single negative charge resulting from the removal of a hydrogen atom at the site 1, the site 2, and the site 3, respectively. Activated glycerol molecules having multiple negative charges include $$AG^{\ominus 1 \& 2}, AG^{\ominus 1 \& 3}, AG^{\ominus 2 \& 3}, AG^{\ominus 1 \& 2 \& 3}.$$

A molecule of diethylenetriamine is illustrated generally in FIG. 8 and designated by the reference numeral 43. In this molecule, the amine groups occur at three sites designated by the reference numerals 4, 5 and 6. At each of the sites 4, 5 and 6, a nitrogen atom provides two extra electrons shown generally by the arrows 45. These electron pairs have a strong attraction to the hydrogen atom occurring in the hydroxyl groups of the glycerol molecule 41. Thus, the amine molecule 43 has strong basic properties which break up the hydroxyl groups in the glycerol molecule 41. When the glycerol molecule 41 is activated, the hydrogen ion from the particular hydroxyl group at one of the sites 1, 2 and 3 will associate with the amine group of at least one of the sites 4, 5 and 6 in the amine molecule 43. In addition to activating the glycerol molecule 41, this will also activate the amine molecule 43, thereby providing it with at lesat one positive charge. These activated amine molecules, hereinafter abbreviated "AA," can be designated with a notation prviously discussed to distinguish the associated charge and particular site, 4, 5 and 6, at which the hydrogen ion association occurs. It will be apparent to those skilled in the art that seven possible activated amine molecules can be formed:

| ⊕4 | ⊕5 | ⊖6 | ⊕⊕4&5 | ⊖⊕5&6 | ⊕⊖4&6 | ⊕⊕⊖4&5&6 |
|---|---|---|---|---|---|---|
| AA, | AA, | AA, | AA , | AA , | AA , | and AA |

Another amine that may be of advantage in a particular embodiment of the invention is ehtylenediamine whose molecular structure is illustrated in FIG. 9. Ethylenediamine has a lower boiling point but it also has a lower viscosity than diethylenetriamine. Both of these amines are of particular advantage to the present invention since they do not decompose. Although heat is usually given off in the decomposition of a chemical, the decomposition of amines often produces cyclic amines which can be toxic. In the present invention, neither the diethylenetriamine nor the ethylenediamine decompose so that no cyclic amines are produced.

The reaction wherein a portion of the glycerol and a portion of the amine are activated produces heat. This heat is essentially lost in an embodiment wherein the pack 27 is stored after the glycerol and the amine have been mixed.

In an embodiment including magnesium chloride, glycerol, and diethylenetriamine, water will typically be present in the glycerol as an intrinsic impurity. It is desirable that this water be maintained within a range of 1 to 4 percent by weight. An abundance of water may be undesirable since the elevated temperatures produced by the hot pack 27 may tend to transform the liquid water to steam and thereby unduly pressurize the first container 29. However, a little water is desirable in the glycerol since initially the water will react with the magnesium chloride to form magnesium chloride hexahydrate and to give off a first quantity of heat. This first quantity of heat may be of a magnitude sufficient to raise the temperature of the pack 27 to a value such as 110° C, depending on the environment. The reaction between the water and the magnesium chloride, illustrated in FIG. 10, will probably occur within the first three seconds after the second container 31 is ruptured and the first and second chemicals 33 and 35, respectively, are mixed.

The remaining reactions are enhanced by the first quantity of heat produced in this initial reaction. For example, one of the effects of this heat is to lower the viscosity of the second chemical 35 so that it mixes more easily with the first chemical 33. The first quantity of heat will also break down a portion of the magnesium chloride into magnesium ions $Mg^{++}$, magnesium chloride ions $MgCl^+$ and a chloride ion $Cl^-$. This decomposition is illustrated by a pair of equations 44 and 46 in FIG. 11. These remaining reactions between the magnesium chloride, the glycerol, the amine, the activated glycerol, and the activated amine can occur substantially simultaneously. As a result, the heat produced in each of these reactions is combined to support an elevated temperature such as 250° C.

In a first type of reaction , the activated glycerol molecules, which have a negative charge, will react with the magnesium chloride, for example, as shown by a pair of equations 47 and 49 in FIG. 12. It will be noted that in accordance with equation 47, two chlorine ions are released while in the reaction represented by equation 49, only a single chlorine ion is released. It is stressed that the equations 47 and 49 are merely representative of many reactions which can occur between one of the seven possible activated amine molecules (having a total of 12 donor sites) and the magnesium chloride in the first chemical 33. Of particular importance is the fact that each of these reactions produces heat which contributes to the maintenance of an elevated temperature.

The activated amine, which will have a positive charge, will also react with the magnesium chloride, for example, as shown by a pair of equations 51 and 53 illustrated in FIG. 13. In addition to producing heat, the reactions represented by the equation 51 releases a magnesium chloride ion $MgCl^+$ and the reaction represented by the equation 53 releases a magnesium ion $Mg^{++}$. It will be apparent to those skilled in the art that since the activated amine occurs in seven forms and the magnesium chloride can combine with a particular activated amine at several sites, the equations 51 and 53 are merely representative of many possible reactions between an activated amine molecule and the magnesium chloride.

Various combination salts can be formed by the association of magnesium chloride with both an activated amine molecule and an activated glycerol molecule. Such a reaction is illustrated in FIG. 14. In similar reactions, there may be more of an amine charge than a glycerol charge, in which case positive ions of magnesium chloride $MgCl^+$ and magnesium $Mg^{++}$ may be formed. Similarly, there may be more of a glycerol charge than an amine charge, in which case additional chlorine ions will be freed. It will be apparent to those skilled in the art that the reactions producing combination salts are significant in number. Nonetheless, it should be noted that each of these reactions produces a quantity of heat which helps support the elevated temperature of the hot pack 27.

It has been shown that various magnesium ions, magnesium chloride ions, and chloride ions can be released in reactions such as those represented by the equations 44, 46, 47, 49, 51, and 53. Since these ions have charges of their own, the activated glycerol and activated amine ions have even a stronger attraction to the ions released from the first chemical 33. For example, in another type of reaction, an activated glycerol ion may combine with either a magnesium ion $Mg^{++}$ or a magnesium chloride ion $MgCl^+$ to produce heat. Such a reaction is illustrated by the equations 55 and 57 in FIG. 15. The equations 55 and 57 are merely representative of many reactions which can occur between activated glycerol molecules and the free ions of magnesium chloride. Each of these reactions produces heat which provides additional support for the elevated temperature of the hot pack 27.

In a similar manner, the activated amines will have a strong attraction to released chloride ions produced for example in the equations 44, 46, 47 and 49. An example of such a reaction is provided by the equations designated by the reference numerals 59 and 61 in FIG. 16. As noted with respect to each of these types of reactions the reactions represented by the equations 49 and 61 can occur in many possible ways. Furthermore, each of these reactions produces heat which further supports the elevated temperature of the hot pack 27.

Additional heat producing reactions occur between the unactivated portions of the second chemical 35 and the magnesium chloride. For example, eighteen possible reactions can occur between magnesium chloride and unactivated diethylenetriamine (UA). Representative of these eighteen possible reactions are the reactions represented by the equations 63 and 65 in FIG. 17. As with the previous types of reactions, the reactions represented by the equations 63 and 65 also produce heat. In addition, these reactions release additional chlorine ions which are particularly attractive to activated amine molecules as shown by equations 59 and 61.

A total of eighteen possible reactions can also occur between the unactivated glycerol (UG) in the second chemical 35 and the magnesium chloride in the first chemical 33. Representative of these reactions are those illustrated by the equations 67 and 69 in FIG. 18. In addition to producing heat for supporting the elevated temperature of the hot pack 27, the reactions represented by the equations 67 and 69 free chlorine ions which are particularly reactive with the activated amines.

It is apparent that with the many possible reactions which can occur between the first and second chemicals 33 and 35 respectively, a particular molecule or ion will not remain in an unassociated state for an extended period of time. Rather, it will associate with other free molecules and ions in a heat producing reaction. Many of these heat producing reactions will release other ions which will then associate with other molecules in further heat producing reactions. It was surprising to find that the combination of magnesium chloride, glycerol and diethylenetriamine could release a sufficient quantity of heat to elevate the temperature of the hot pack 27 to a magnitude such as 250° C. It is now believed that this quantity of heat results from the significant number of heat producing reactions which are constantly occurring.

Although the invention has been described with reference to specific embodiments of the hot pack 27 and specific steps in the cable splicing method, it will be apparent that the invention can be otherwise embodied and performed respectively so that the invention should be ascertained only with reference to the following claims.

I claim:

1. A portable heat source, including:
a first container;
a second container disposed in the first container;
first chemical means disposed in a particular one of the first and second containers;
second chemical means disposed in the other one of the first and second containers and having properties for entering at least a first reaction with the first chemical means to produce a first quality of heat and thereby elevate the temperature of the heat source to a first particular temperature;
third chemical means disposed in the other one of the first and second containers and having properties for entering at least a second reaction with the first chemical means in the first container to generate a second quantity of heat and thereby elevate the temperature of the heat source to a second particular temperature, the second and third chemical means having properties of activating each other to produce a greater amount of heat than the sum of the first and second quantities of heat when combined chemically with the first chemical means and thereby generate a third temperature higher than the first and second particular temperatures;
the second container having properties for being ruptured to permit the mixing and reacting of the first chemical with the second and third chemicals to produce heat and thereby elevate the temperature of the heat source.

2. The portable heat source recited in claim 1 wherein the second and third chemical means have properties for entering a third plurality of reactions with the first chemical means, each reaction occuring at a progressively elevated temperature, to produce a third quantity of heat and thereby further elevate the temperature of the heat source higher than the first and second particular temperatures.

3. The portable heat source recited in claim 1 wherein the second chemical means includes a polyalcohol having a plurality of hydrogen bonding sites and the third chemical means has basic properties for breaking at least a portion of the hydrogen bonding sites of the polyalcohol to make the second chemical means more reactive with the first chemical means.

4. The portable heat source set forth in claim 3 wherein the third chemical means includes an amine having properties of becoming activated when mixed with the polyalcohol to make the third chemical means more reactive with the first chemical means and the first chemical means includes a metal salt.

5. The portable heat source set forth in claim 4 wherein the metal salt is magnesium chloride, the amine is diethylenetriamine, and the polyalcohol is glycerol.

6. The portable heat source set forth in claim 5 wherein
the magnesium chloride has a relative percentage by weight of approximately 45 to 60 percent, the glycerol has a relative percentage by weight of approximately 30 to 40 percent and the amine has a relative percentage by weight of approximately 8 to 12 percent.

7. The portable heat source set forth in claim 5, wherein
the magnesium chloride has a relative percentage by weight of approximately 53.6 percent, the glycerol has a relative percentage by weight of approximately 35.7 percent and the amine has a relative percentage by weight of approximately 10.7 percent.

8. The portable heat source recited in claim 1 wherein the third chemical means has properties for decreasing the viscosity of the second chemical means to facilitate the mixing of the second chemical means with the first chemical and thereby enhance the reaction of the second chemical means with the first chemical means.

9. The portable heat source recited in claim 1 wherein the second chemical means includes an impurity which enters an initial reaction with the first chemical means to produce a third quantity of hest, and the second chemical means has properties of providing a decreased viscosity, when subjected to the third quantity of heat, to facilitate the production of heat during the reaction of the second chemical means with the first chemical means.

10. The combination recited in claim 9, including:
a first cable end having electrically conductive properties,
a second cable end having electrically conductive properties, the second cable end being disposable in electrically conductive relationship with the first cable end,
a sleeve having electrically insulating properties and properties of shrinking when subjected to heat at the third temperature, the sleeve being disposable on the first and second cable ends, and
the first container being disposable in enveloping relationship to the sleeve to shrink the sleeve on the first and second cable ends when the second container is ruptured.

11. The combination set forth in claim 1, including,
a first cable end having electrically conductive properties,
a second cable end having electrically conductive properties, the second cable end being disposable in electrically conducting relationship with the first cable end,
a sleeve disposed on the first and second cable ends, the sleeve being provided with properties for shrinking on the first and second cable ends when subjected to heat at the third temperature, and
the first container having properties of enveloping the sleeve to generate heat at the particular temperature when the second container is ruptured.

12. In combination, including:
at least a first chemical;
second chemical means including a second chemical having properties for reacting with the first chemical in a first flameless, non-explosive reaction to produce non-toxic reaction products and to give off heat;
a third chemical included in the second chemical means in a limited amount and having characteristics for entering in a second reaction with the first chemical to produce non-toxic reaction products and to give off a first quality of heat;
a fourth chemical included in the second chemical means and having properties for entering in a third reaction with the first chemical in the second chemical means to produce non-toxic reaction components and to give off heat, the second and fourth chemicals having properties of activating each other for enhanced reactions with the first chemical means at elevated temperatures resulting from the reaction of the third chemical with the first chemical;
means for containing the first chemical; and
means for retaining the second chemical means in chemically isolated relationship from the first chemical for controlled mixing with the first chemical.

13. The combination set forth in claim 12 wherein the third chemical includes an impurity which has properties for entering a second reaction with the first chemical to produce a particular quantity of heat, and the fourth chemical has properties of providing a decreased viscosity, when subjected to the particular quantity of heat, to facilitate the mixing of the fourth chemical with the first chemical for an enhanced reaction between the first and fourth chemicals.

14. The combination recited in claim 12 wherein the second and fourth chemicals have properties when mixed of reacting with the first chemical in a plurality of reactions to give off a quantity of heat greater than that provided by the sum of the individual reactions of the second chemical with the first chemical and the third chemical with the first chemical.

15. The combination recited in claim 14 wherein the fourth chemical includes an amine, at least a portion of which is activated by the second chemical to increase the second quantity of heat given off during the third reaction.

16. The combination set forth in claim 15 wherein:
after the second reaction, a portion of the amine and a portion of the third chemical remain unactivated;
the unactivated amine reacts with the first chemical in a fourth reaction to produce heat; and
the unactivated third chemical reacts with the first chemical in a fifth reaction to produce heat.

17. The combination set forth in claim 12, including,
a first cable end having electrically conductive properties,
a second cable end having electrically conductive properties, the second cable end being disposable in electrically conducting relationship with the first cable end,
a sleeve disposed on the first and second cable ends, the sleeve being provided with properties for shrinking on the first and second cable ends when subjected to heat at elevated temperatures resulting from the mixing of the first, second, third and fourth chemicals, and
the first container means having properties of enveloping the sleeve to generate heat when the first, second, third and fourth chemicals are mixed.

18. In combination for generating heat,
a first chemical having a first chemical composition;
a second chemical having a second chemical composition different from the first chemical composition and having properties of reacting with the first chemical to generate heat;
a third chemical having a third chemical composition different from the first and second chemical compositions and having properties of reacting with the first chemical to generate heat;
the first and second chemicals having properties of activating each other when mixed to provide an enhanced reaction between the first chemical and each of the second and third chemicals and to provide flameless, non-explosive, non-toxic and essentially non-gaseous reaction products in such reactions;
means for holding the first chemical; and
means for holding the second and third chemicals in chemically isolated relationship to the first chemical and for providing a controlled mixing of the second and third chemicals with the first chemical to obtain the enhanced reactions between the first chemical and the second and third chemicals.

19. In the combination set forth in claim 18,
the second chemical has properties of decreasing the viscosity of the third chemical, when mixed with the first chemical, to facilitate the mixing of the third chemical with the first chemical.

20. The combination set forth in claim 19, including,
a first cable end having electrically conductive properties,
a second cable end having electrically conductive properties, the second cable end being disposable in electrically conductive relationship with the first cable end,
a sleeve disposed on the first and second cable ends, the sleeve being provided with properties for shrinking on the first and second cable ends when subjected to heat produced by the reactions of the first, second and third chemicals, and
the holding means for the first chemical having properties of enveloping the sleeve to generate heat when the second and third chemicals are subject to controlled mixing with the first chemical.

21. In the combination set forth in claim 18, the first chemical constituting a salt, the second chemical constituting an amine and the third chemical constituting a polyalcohol.

22. In the combination set forth in claim 21, the first chemical constituting magnesium chloride, the second chemical constituting diethylenetriamine and the third chemical constituting glycerol.

23. In combination for generating heat,
a first chemical;
a second chemical having properties of reacting with the first chemical to generate a first quantity of heat;
a third chemical having properties of reacting with the first chemical to generate a second quantity of heat;
each of the second and third chemicals having properties of activating the other one of the second and third chemicals to provide a plurality of reactions at progressively elevated temperatures with by-products of previous reactions and thereby generate a third quantity of heat greater than the sums of the first and second quantities, the second and third chemicals having properties of reacting with the first chemical to provide flameless, non-explosive, non-toxic and essentially non-gaseous reaction products in such reactions;
a fourth chemical included in a limited quantity in a particular one of the second and third chemicals and having properties of reacting with the first chemical to generate heat to initiate the plurality of reactions between the first chemical and the second and third chemicals.

24. In the combination set forth in claim 23,
each of the second and third chemicals having properties of decreasing the viscosity of the other one of the second and third chemicals to facilitate the mixing of the first chemical with the second and third chemicals.

25. In the combination set forth in claim 24, the first chemical constituting a salt, the second chemical constituting an amine and the third chemical constituting a polyalcohol.

26. In the combination set forth in claim 24,
the first chemical constituting magnesium chloride, the second chemical constituting diethylenetriamine, the third chemical constituting glycerol and the fourth chemical constituting water.

27. In the combination set forth in claim 26,
the magnesium chloride having a relative percentage by weight of approximately 45 to 60 percent, the glycerol having a relative percentage by weight of approximately 30 to 40 percent and the amine having a relative percentage by weight of approximately 8 to 12 percent and the water having a relative percentage by weight of 1 to 4 percent.

* * * * *